Nov. 2, 1948. J. H. BLYTHE 2,452,718
CUTTING TORCH HOLDER
Filed July 24, 1944
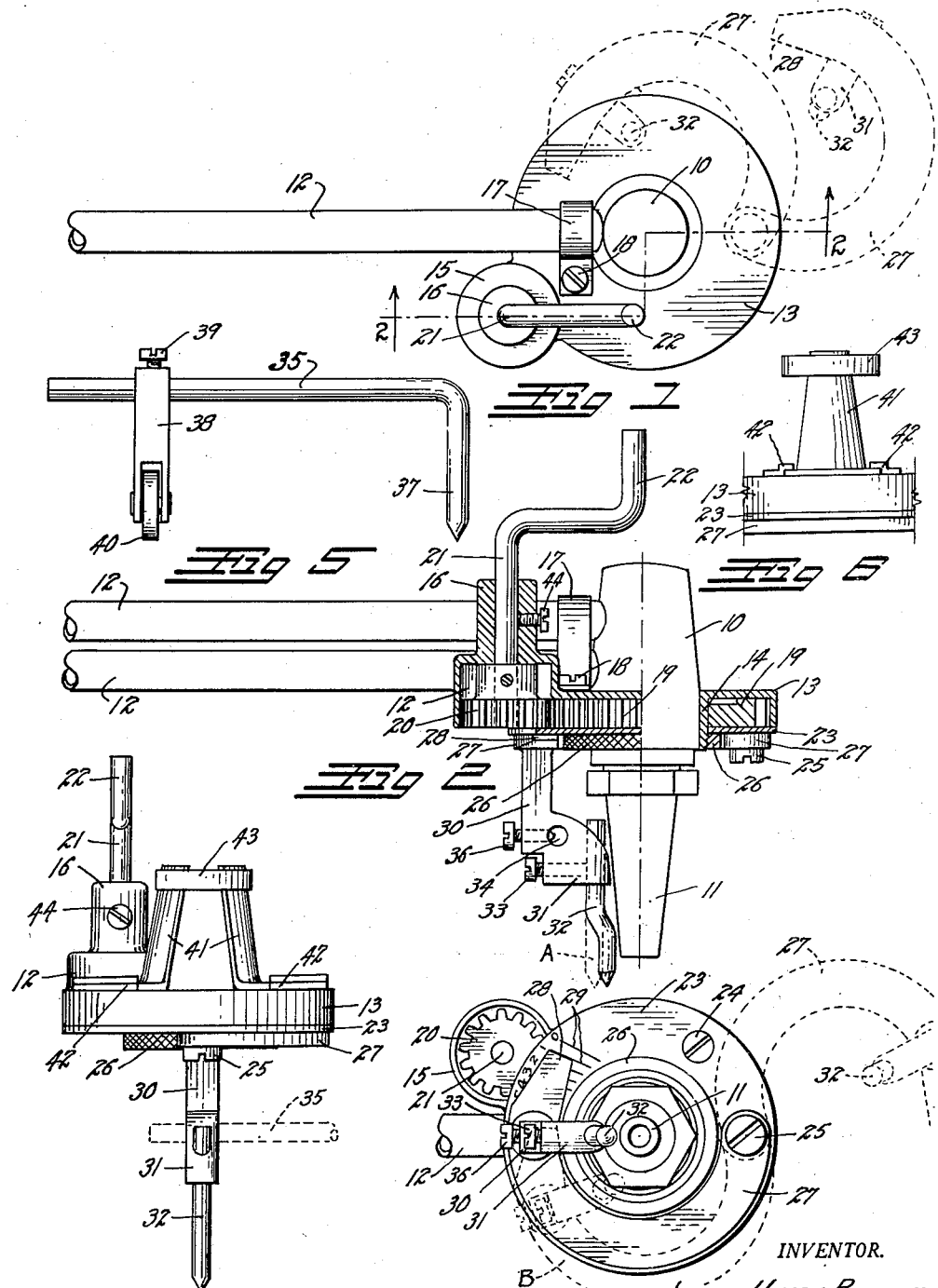
INVENTOR.
JAMES HENRY BLYTHE
BY
ATTORNEY Patented Nov. 2, 1948

2,452,718

UNITED STATES PATENT OFFICE 2,452,718

CUTTING TORCH HOLDER

James Henry Blythe, Denver, Colo.

Application July 24, 1944, Serial No. 546,355

11 Claims. (Cl. 33—27)

1

This invention relates to a guiding attachment for metal cutting torches and has for its principal object the provision of a device of this character which can be quickly and easily attached to any standard torch head for guiding the cutting flame in a circular path.

Another object of the invention is to provide a device of this character which can be used for accurately guiding the torch in circles of any desired diameter; which will uniformly advance the torch around a circumference at the proper cutting speed so as to burn a smooth even edge without the formation of slag; which can be used in close quarters such as in the corners and near the edges of floor plates without interference; which will be adjustable, without attachments, for cutting circles for ½" diameter to 4" diameter; which with the addition of a simple extension member can be adapted to cut circles of any desired diameter; and which will require only a single center punch mark to establish its location.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a top view of the improved torch guiding attachment, illustrating it in place on a typical cutting torch;

Fig. 2 is a sectional view thereof, taken on the line 2—2, Fig. 1;

Fig. 3 is a bottom view thereof, looking upward;

Fig. 4 is an end view thereof with the cutting torch removed illustrating an alternate structure for attaching the attachment to a cutting torch;

Fig. 5 is a detail view illustrating an extension arm which may be used with the attachment; and Fig. 6 is a fragmentary end view of the alternate structure of Fig. 4

The views of the drawing are approximately full size and in broken line in Figs. 1 and 3 various adjusted positions of the device are illustrated.

A typical cutting torch head is illustrated at 10 with its flame tip at 11 and gas tubes at 12. This invention is designed for attachment about the head 10. It employs a circular open bottomed

2 housing 13 having a central opening for the passage of the torch head 10. A cylindrical bearing sleeve 14 surrounds the central opening and extends downwardly below the housing 13 terminating in a threaded lower extremity. A circular pinion cavity 15 is formed at the edge of the housing 13 from which a shaft bearing boss 16 arises. The housing is attached to the torch head 10 by passing the latter into the sleeve 14 and securing it therein by means of a hooked attachment clip 17 which is secured to the top of the housing 13 by means of a suitable attachment screw 18.

A ring gear 19 is journalled on the bearing sleeve 14 within the housing 13. The gear 19 meshes with a drive pinion 20 positioned within the cavity 15. The pinion 20 is secured upon the lower extremity of a crank shaft 21 which is rotatably mounted in the bearing boss 16 and which terminates at its upper extremity in a crank 22. An annular bottom plate 23 is secured upon the lower face of the gear 19 by means of an attachment screw 24 and a clamp screw 25. The plate extends outwardly beyond the gear 19 to close the bottom of the housing 13.

The ring gear 19 is supported in the housing by means of a knurled ring nut 26 which is threaded upon the threaded lower extremity of the bearing sleeve 14 against the plate 23. The pinion 20 is supported by the bottom plate 23 which overlaps the former.

An arcuate radius arm 27 is mounted at its one extremity on the clamp screw 25 against the bottom of the bottom plate 23. The arm 27 extends in a semi-circular arc about the ring nut 26 terminating in an indicating extremity 28 which aligns with scale markings 29 on the bottom plate 23.

A center post is affixed to, and extends downward from, the radius arm 27 at a point diametrically opposite the clamp screw 25. The post 30 terminates in a foot 31 which extends inwardly toward the flame tip 11. The foot 31 is drilled vertically to receive a pointed center pin 32, which may be locked therein by means of a set screw 33, and is provided with a horizontal hole 34 to receive an L-shaped, pointed, extension center bar 35 (see Fig. 5) which may be locked in the hole 34 by means of a second set screw 36.

The center pin 32, as illustrated, is offset to place its point as close as possible to the flame tip 11. If this close proximity is not necessary a straight center pin may be used as indicated in broken line at A in Fig. 2.

Let us assume that it is desired to flame cut a 1" hole in a steel plate. The clamp screw 25 is loosened and the arm 27 is swung outwardly as indicated at B in Fig. 3, until the indicating extremity thereof aligns with the proper 1" scale marking 29 on the bottom plate. The clamp screw 25 is now tightened to clamp the arm in this position. A center punch indentation is formed in the steel plate at the center for the desired hole.

The cutting flame is ignited and adjusted and the operator grips the gas tubes 12 in one hand and the crank 22 in the other. The pointed tip of the center pin 32 is now placed in the center punch mark and the crank 22 is rotated. This causes the ring gear 19 to rotate as a planet gear and travel in a circular orbit about the center pin 32. Since the flame tip 11 is located at the axis of the gear 19 it also travels in a perfect circle about center punch mark to cut a circular disc from the plate. Since the crank moves at a much faster lineal speed than the flame tip any variations in speed of the former are minimized in the travel of the latter so that an exceedingly smooth edge is produced having the appearance of a drilled hole.

The diameter of the hole is determined by the position of the radius arm 27 as indicated by the broken line positions of Figs. 1 and 3. For round holes of larger diameter than allowed by the radius arm, the extension bar 35 of Fig. 5 is used. This bar may have any desired length and terminates at one extremity in a downwardly turned center point 37. The other extremity is designed to enter the hole 34 in the foot 31 and be clamped therein at the desired radius by means of the set screw 36, as indicated in broken line in Fig. 4.

It is difficult to support the torch at the most efficient cutting distance on large circles due to the distance from the supporting center point 37. This is overcome in the present invention by mounting a wheel post 38 on the extension bar by means of a suitable set screw 39. The wheel post carries a supporting wheel 40 which rides over the surface of the plate to support the torch at the proper height.

In Fig. 4 an alternate form of attachment to the torch is illustrated consisting of two inclined curved plates 41 shaped to fit to the two sides of the upper portion of the torch head 10. The bases of the plates are flanged outwardly to fit into slide guides 42 on the top of the housing 13. After the torch head is in place, the plates are slid against the sides thereof and clamped thereagainst by means of a clamp ring 43 of a diameter to fit over the head and over the upper extremities of the plates as illustrated in Fig. 4.

A set screw 44 is provided in the boss 16 for locking the crank shaft 21 against rotation when desired. This is for use when following a straight edge or template. For this use the crank 22 is rotated to bring the center pin 32 on the desired side of the flame tip 12 and is then locked in this position by means of the set screw 44. The torch is then moved along the pattern with the pin 32 bearing against and following the guiding straight edge or template.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A guiding attachment for a tool comprising: a ring gear mounted to rotate about the axis of said tool; means for rotating said ring gear about said tool; and a center point member secured to said ring gear and extending therefrom to radial position with reference to the axis of said tool.

2. A guiding attachment for a tool comprising: a ring gear mounted to rotate about the axis of said tool; means for rotating said ring gear about said tool; a radius arm; means mounting said radius arm on said ring gear to permit radial adjustment of the former; and a center point member mounted on said radius arm and extending therefrom to a radial position with reference to the axis of said tool.

3. A guiding attachment for a tool comprising: a ring gear mounted to rotate about the axis of said tool; means for rotating said ring gear about said tool; a radius arm pivotally clamped at its one extremity to said ring gear at one side of the axis of said tool and extending arcuately thereabout to the opposite side thereof; and a center point member extending from the free extremity of said arm to a radial position with reference to said axis.

4. A guiding attachment for a tool comprising: a housing; means for attaching said housing to said tool about the axis thereof; a ring gear journalled in said housing concentrically of said axis; means for rotating said ring gear; a radius arm; a pivot member securing one extremity of said arm to said ring gear; a center post projecting from the other extremity of said arm in a direction substantially parallel to the axis of said tool; and means for securing a centering member in said post, said arm being arcuately curved so that it may partially surround said tool to bring said post to a position substantially diametrically opposite said pivot member if desired.

5. Means for guiding a tool in a circle comprising: a housing having an opening for the passage of said tool; a bearing sleeve in said housing about the axis of said tool; a gear mounted on said bearing sleeve so as to rotate about said axis; a pinion in mesh with said gear; crank means for rotating said pinion; and a center point carried by said gear.

6. Means for guiding a tool in a circle comprising: a housing having an opening for the passage of said tool; a bearing sleeve in said housing about the axis of said tool; a gear mounted on said bearing sleeve so as to rotate about said axis; a pinion in mesh with said gear; crank means for rotating said pinion; an arcuate lever pivoted on the lower face of said gear, said lever being curved so that it may be swung to partially surround said axis; and a center point member mounted on said lever at point spaced from the pivot thereof.

7. Means for guiding a tool in a circle comprising: a housing having an opening for the passage of said tool; a bearing sleeve in said housing about the axis of said tool; a gear mounted on said bearing sleeve so as to rotate about said axis; a pinion in mesh with said gear; crank means for rotating said pinion; an arcuate lever pivoted on the lower face of said gear, said lever being curved so that it may be swung to partially surround said axis; a center point member mounted on said lever at point spaced from the pivot thereof; an indication plate secured to said gear between the latter and said lever, said plate carrying indications; and an indicating extremity formed on said lever over said plate to designate the positions of said lever about its pivot.

8. Means for guiding a tool in a circle comprising; a housing having an opening for the passage of said tool; a bearing sleeve in said housing about the axis of said tool; a gear mounted on said bearing sleeve so as to rotate about said axis; a pinion in mesh with said gear; crank means for rotating said pinion; a center post supported from and extending downwardly from said gear; a foot member on said post having a center pin opening; a pointed center pin carried in said opening; and means for locking said pin therein.

9. Means for guiding a tool in a circle comprising; a housing having an opening for the passage of said tool; a bearing sleeve in said housing about the axis of said tool; a gear mounted on said bearing sleeve so as to rotate about said axis; a pinion in mesh with said gear; crank means for rotating said pinion; a center point carried by said gear; an annular nut threaded on said bearing sleeve to retain said gear thereon; and means for securing said housing to said tool.

10. Means for guiding a tool in a circle comprising; a housing having an opening for the passage of said tool; a bearing sleeve in said housing about the axis of said tool; a gear mounted on said bearing sleeve so as to rotate about said axis; a pinion in mesh with said gear; crank means for rotating said pinion; movable clamping members mounted on said housing for engaging said tool; and means for locking said clamping members in engagement with said tool to hold said housing in place thereon.

11. Means for guiding a tool in a circle comprising; a housing having an opening for the passage of said tool; a bearing sleeve in said housing about the axis of said tool; a gear mounted on said bearing sleeve so as to rotate about said axis; a pinion in mesh with said gear; crank means for rotating said pinion; a center point carried by said gear; means for securing said housing to said tool; and means for locking said pinion and gear against rotation when desired.

JAMES HENRY BLYTHE.

REFERENCES CITED

The following references are of record in the file of this patent:

UNITED STATES PATENTS

| Number | Name | Date |
|---|---|---|
| 1,495,994 | Farmer | June 3, 1924 |
| 1,792,317 | Marsh | Feb. 10, 1931 |
| 2,224,242 | Young | Dec. 10, 1940 |

FOREIGN PATENTS

| Number | Country | Date |
|---|---|---|
| 232,264 | Germany | Mar. 10, 1911 |
| 501,146 | Germany | June 30, 1930 |
| 653,502 | Germany | Nov. 25, 1937 |